United States Patent [19]

Menovcik et al.

[11] Patent Number: 5,475,064
[45] Date of Patent: Dec. 12, 1995

[54] CARBAMATE-FUNCTIONAL POLYESTER POLYMER OR OLIGOMER AND COATING COMPOSITION

[75] Inventors: Gregory L. Menovcik, Farmington Hills; Walter H. Ohrbom, Commerce Township, both of Mich.

[73] Assignee: BASF Corporation, Southfield, Mich.

[21] Appl. No.: 485,763

[22] Filed: Jun. 7, 1995

Related U.S. Application Data

[62] Division of Ser. No. 361,244, Dec. 21, 1994, Pat. No. 5,451,656.

[51] Int. Cl.$^6$ ...................................................... C08F 20/00
[52] U.S. Cl. ........................ 525/441; 528/272; 528/288; 528/291; 525/437
[58] Field of Search ................................ 528/272, 288, 528/291; 525/437, 441

[56] References Cited

U.S. PATENT DOCUMENTS

| | | | |
|---|---|---|---|
| 4,702,851 | 10/1987 | Wollenberg | 252/49.6 |
| 4,746,446 | 5/1988 | Wollenberg | 252/49.6 |
| 4,747,965 | 5/1988 | Wollenberg | 252/51.5 |
| 4,758,632 | 7/1988 | Parekh et al. | 525/383 |
| 5,336,566 | 8/1994 | Rehfuss | 428/524 |
| 5,356,669 | 10/1994 | Rehfuss | 427/407.1 |
| 5,384,367 | 1/1995 | Swarup et al. | 525/169 |

*Primary Examiner*—Samuel A. Acquah
*Attorney, Agent, or Firm*—Paul L. Marshall

[57] ABSTRACT

Polyester polymers having pendant carbamate groups are disclosed. The polymers are prepared by:
(a) reacting a hydroxyalkyl cyclic carbonate with ammonia, ammonium hydroxide, or a primary amine to form a dihydric alcohol having a carbamate group appended thereto,
(b) reacting the dihydric alcohol from (a) and a cyclic anhydride to form a half-ester diacid having a carbamate group appended thereto, and
(c) reacting a mixture comprising the half-ester diacid from step (b) and a polyol to form a polyester having carbamate groups appended thereto.

3 Claims, No Drawings

CARBAMATE-FUNCTIONAL POLYESTER POLYMER OR OLIGOMER AND COATING COMPOSITION

This is a divisional of application Ser. No. 08/361,244 filed on Dec. 21, 1994 now U.S. Pat. No. 5,451,656.

FIELD OF THE INVENTION

This invention relates to polymers, and in particular to curable coating compositions that contain containing polymers.

BACKGROUND OF THE INVENTION

Polymers and oligomers having carbamate functional groups have been used in a variety of curable compositions. Carbamate-functional acrylic polymers are described, for example, in U.S. Pat. No. 5,356,669 and WO 94/10211. These can be prepared by addition polymerization of carbamate-functional acrylic monomers or by transcarbamylation of a hydroxy functional acrylic with an alkyl carbamate. Carbamate-functional polyesters, prepared by transcarbamylation of a hydroxy-functional polyester, are described in JP 51/4124.

Polyesters are widely used in curable compositions such as coating compositions. These resins offer many beneficial properties, such as good durability, good dispersibility in aqueous systems through incorporation of appropriate ionic or nonionic stabilizing groups, impact resistance, good adhesion, and other physical properties such as stress release. One area of concern with polyester resins for curable compositions has been the incorporation into the resin of sufficient levels of functional groups to achieve the desired cure performance. Hydroxyl groups are commonly used as functional groups in curable compositions, but polyester resins with pendant hydroxyl groups are difficult to prepare since any pendant hydroxyl groups would be consumed by reaction with acid groups during formation of the polyester. Hydroxyl functional groups are usually incorporated onto polyester resins by the use of polyol capping agents like trimethylol propane resulting in terminal OH groups, but no pendant OH groups. Such resins provide only limited crosslink density upon cure. The crosslink density may be increased somewhat by using branched polyesters, which are prepared by the incorporation of trifunctional or higher functional polyols or polyacids in the polyester reaction mixture. However, the degree of branching is often limited due to gelation. Low crosslink density in curable polyester resin systems must often be compensated for by using higher molecular weight resins that more closely resemble thermoplastic compositions than thermoset compositions.

Carbamate-functional polyesters are described in JP 51/4124. This reference describes the preparation of polyesters having carbamate terminal groups by the transesterification of a typical hydroxy-functional polyester with an alkyl carbamate.

Accordingly, the present invention is directed toward a new method of preparing polyester polymers or oligomers having pendant carbamate groups. It is also desirable to prepare polyester polymers or oligomers while avoiding the formation of side products that could reduce the purity of the final polyester.

SUMMARY OF THE INVENTION

According to the present invention, a method of preparing a polyester polymer or oligomer is provided comprising:

(a) reacting a hydroxyalkyl cyclic carbonate with ammonia, ammonium hydroxide, or a primary amine to form a dihydric alcohol having a carbamate group appended thereto, (b) reacting the dihydric alcohol from (a) and a cyclic anhydride to form a half-ester diacid having a carbamate group appended thereto, and (c) reacting a mixture comprising the half-ester diacid from step (b) and a polyol to form a polyester having carbamate groups appended thereto.

In another embodiment of the invention, there are provided curable coating compositions comprising the above-described carbamate-functional polyester and a curing agent that is reactive with carbamate.

DESCRIPTION OF THE PREFERRED EMBODIMENTS

The hydroxyalkyl cyclic carbonate used in the practice of the invention can be prepared by a number of approaches. Certain hydroxyalkyl cyclic carbonates like 3-hydroxypropyl carbonate (i.e., glycerine carbonate) are commercially available. Cyclic carbonate compounds can be synthesized by any of several different approaches. One approach involves reacting an epoxy group-containing compound with $CO_2$, preferably under pressure with a catalyst. Useful catalysts include any that activate an oxirane ring, such as tertiary amine quaternay salts (e.g., tetramethyl ammonium bromide), tin and/or phosphorous complex salts (e.g., $(CH_3)_3SNI:(CH_3)_4PI$). Epoxides can also be reacted with β-bytyrolactone in the presence of such catalysts. In another approach, a glycol like glycerine is reacted at temperatures of at least 80° C. (usually under reflux) with diethyl carbonate in the presence, of a catalyst (e.g., potassium carbonate) to form a hydroxyalkyl carbonate. Alternatively, a functional compound containing a ketal of a 1,2-diol having the structure:

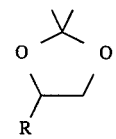

can be ring-opened with water at temperatures of at least 60° C., preferably with a trace amount of acid, to form a 1,2-glycol, which is then further reacted with diethyl carbonate to form the cyclic carbonate.

Cyclic carbonates typically have 5–6-membered rings, as is known in the art. Five-membered rings are preferred, due to their ease of synthesis and greater degree of commercial availability. Preferred hydroxyalkyl cyclic carbonates used in the practice can be represented by the formula:

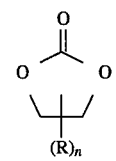

where R is a hydroxyalkyl group of 1–18 carbon atoms, preferably 1–6 carbon atoms, and more preferably 1–3 carbon atoms, and n is 1 or 2, which may be substituted by one or more other substituents such as blocked amines or unsaturated groups. More preferably, R is —$C_mH_{2m}OH$ where the hydroxyl may be primary or secondary and m is 1 to 8, and even more preferably, R is —$(CH_2)_p$—OH where the hydroxyl is primary and p is 1 to 2.

In step (a) of the invention, the hydroxyalkyl cyclic carbonate is reacted with ammonia, ammonium hydroxide, or a primary amine. This reaction is performed under mild conditions (e.g., 0°–60° C. in water, methanol, or other known solvents. Reaction with ammonia or ammonium hydroxide yields a primary carbamate, and is preferred. Reaction with a primary amine yields a secondary (N-substituted) carbamate. The ring-opening reaction of ammonia, ammonium hydroxide, or a primary amine with the cyclic carbonate group yields a carbamate group as described above and also a primary or secondary hydroxyl group, which takes part in the polyester-forming reaction in the next step of the invention. This reaction product thus comprises a carbamate group, the hydroxyl group that was on the hydroxyalkyl cyclic carbonate, and a hydroxyl group formed by the ring opening of the cyclic carbonate group.

In step (b) of the present invention, the diol having a carbamate group that was produced in step (a) is reacted with an anhydride to form a half-ester diacid having a carbamate group appended thereto. Useful anhydrides include phthalic anhydride, terephthalic anhydride, trimellitic anhydride, pyromellitic anhydride, hexahydrophthalic anhydride, methyl hexahydrophthalic anhydride, maleic anhydride, glutamic anhydride, 1,2,4,5-bisanhydride cyclohexane. The anhydride reaction is typically carried out at temperatures under 120° C., preferably under 110° C., and most preferably under 90° C., which can be advantageous because it doesn't subject the carbamate diol to harsh reaction conditions that could lead to side reactions such as re-closure to form the original cyclic carbonate ring.

In step (c) of the present invention, a mixture comprising the reaction product of step (b) and a polyol is reacted to form a polyester. Useful polyols generally contain more than 2, preferably 2 to about 10 carbon atoms, more preferably about 2 to 8 carbon atoms, in addition to having 2 to about 6, preferably 2 to about 4, hydroxyl groups. Some preferred examples of the polyols are one or more of the following: neopentyl glycol, ethylene glycol, propylene glycol, butanediol, hexamethylemediol, 1,2-cyclohexanedimethanol, 1,3cyclohexanedimethanol, 1,4-cyclohexanedimethanol, trimethylol propane, pentaerythritol, neopentyl glycol hydroxypivalate diethylene glycol, triethylene glycol, tetraethylene glycol, dipropylene glycol, polypropylene glycol, hexylene glycol, 2-methyl- 2-ethyl-1,3-propanediol, 2-ethyl-1,3-hexanediol, 1,5-pentanediol, thiodiglycol, 1,3-propanediol, 1,3-butanediol, 2,3-butanediol, 1,4-butanediol, 2,2,4-trimethyl 1,3-pentanediol, 1,2-cyclohexanediol, 1,3-cyclohexanediol, 1,4-cyclohexanediol, glycerol, trimethylolpropane, trimethylolethane, 1,2,4-butanetriol, 1,2,6-hexanetriol, dipentaerythritol, tripentaerythritol, mannitol, sorbitol, methylglycoside, like compounds apparent to those skilled in the art, and mixtures thereof. Depending on the properties desired for the final resin, certain other polyols can be incorporated into the reaction mixture, such as fatty polyols, phenolic polyols (e.g., hydroquinone, phenolphthalein, bisphenol A), oligomeric, or polymeric polyols (e.g., pre-formed polyester polyols).

The reaction mixture in step (c) may also comprise additional polyacids. The amount of such additional polyacid is determined by the desired level of carbamate functionality for the polyester. Polyacids useful in the practice of the invention may contain about 2 to 34 carbon atoms in aliphatic or aromatic moieties, and at least 2, preferably no more than 4, carboxyl groups which may, alternatively, be present in the form of anhydride groups. The polyacids may be polyacids themselves or cyclic anhydrides of polyacids, which can be ring opened by the carbamate-containing diol or other polyols during the polyester reaction to form acid groups for polyester condensation. Examples of useful polyacids include phthalic anhydride, terephthalic acid, isophthalic acid, adipic acid, succinic acid, glutaric acid, fumaric acid, maleic acid, cyclohexane dicarboxylic acid, trimellitic anhydride, azeleic acid, sebasic acid, dimer acid, pyromellitic dianhydride, substituted maleic and fumaric acids such as citraconic, chloromaleic, or mesaconic acids, and substituted succinic acids such as aconitic and iraconic acids. Mixtures of polyacids can be employed. Additionally, other components, such as reaction modifiers, catalysts, solvents, dispersing agents, and the like as is known in the art.

The proportions of the polyol, the reaction product of step (b), and any other active compounds may be chosen so as to provide an acid-terminated polyester or a hydroxyl-terminated polyester. This can be accomplished by utilizing a stoichiometric excess of polyacid or polyol.

If water-solubility is desired, it is important to build water-stabilizing groups into the polyester. This can be accomplished by incorporating water-stabilizing polyether polyols into the reaction mixture so they are incorporated into the polyester or by utilizing dimethanol propionic acid as a polyol in the reaction mixture.

An intermediate polyester resin may be prepared having hydroxyl or acid terminal groups by the use of an excess of polyacid or polyol component in the polyester reaction mix. The terminal groups of the resin may then be controlled by reaction of those terminal groups with an excess of a capping agent, as is known in the art. If the intermediate resin is acid terminated, a mono- or multi-functional alcohol may be used to terminate the reaction (cap the free acid groups) at the desired stage (determined by the viscosity and concentration of isocyanate groups present). Multi-functional alcohols, such as ethylene glycol, trimethylolpropane and hydroxyl-terminated polyesters, can also be employed in this manner. If a resin with only carbamate functionality and no hydroxyl functionality, the intermediate polyester resin is preferably capped with a monofunctional alcohol (e.g., n-butanol). Likewise, a hydroxyl-terminated intermediate resin can be capped by reaction with an excess of mono- or polyfunctional acid.

Polyesterification reactions are normally carried out at temperatures between 140° C. and 260° C., and for a time ranging from 3 to 15 hours with or without the use of acid esterification catalysts such as phosphorous acid or toluene sulfonic acid present at levels of 0.1 to 2.0 weight percent. The reaction is optionally carried out in the presence of a solvent, such as an aromatic hydrocarbon, as is known in the art. The reaction may be carried out as a single-stage reaction or as a multistage reaction such as a two-stage reaction. The polyesters thus produced generally have a number average molecular weight of from 1000 to 60,000.

The polyester resin prepared according to the invention can be incorporated into a curable composition such as a coating composition. In a curable composition according to the invention, curing is effected by a reaction of the carbamate-functional polyester component with a component (2) that is a compound having a plurality of functional groups that are reactive with the pendant carbamate groups on the polyester. Such reactive groups include active methylol or methylalkoxy groups on aminoplast crosslinking agents or on other compounds such as phenol/formaldehyde adducts, siloxane groups, and anhydride groups. Examples of curing agents include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Aminoplast resin such as melamine formaldehyde resin or urea formaldehyde resin are especially preferred.

A solvent may optionally be utilized in a curable composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to both the carbamate-functional polyester as well as the curing agent. In general, depending on the solubility characteristics of the components, the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of co-solvents.

The curable composition used in the practice of the invention may include a catalyst to enhance the cure reaction. For example, when aminoplast compounds, especially monomeric melamines, are used, a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

In a preferred embodiment of the invention, the solvent is present in the curable composition in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

Any additional agent used, for example, surfactants, fillers, stabilizers, wetting agents, dispersing agents, adhesion promoters, UV absorbers, HALS, etc. may be incorporated into the coating composition. While the agents are well-known in the prior art, the amount used must be controlled to avoid adversely affecting the coating characteristics.

The curable composition according to the invention is preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80. The curable composition according to the invention can also be used as the basecoat of a composite color-plus-clear coating.

When the coating composition of the invention is used as a high-gloss pigmented paint coating, the pigment may be any organic or inorganic compounds or colored materials, fillers, metallic or other inorganic flake materials such as mica or aluminum flake, and other materials of kind that the art normally names as pigments. Pigments are usually used in the composition in an amount of 1% to 100%, based on the total solid weight of components A and B (i.e., a P:B ratio of 0.1 to 1).

When the coating composition according to the invention is used as the clearcoat of a composite color-plus-clear coating, the pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are are preferably crosslinkable and comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C. The compounds according to the present invention are reactive even at relatively low cure temperatures. Thus, in a preferred embodiment, the cure temperature is preferably between 115° C. and 150° C., and more preferably at temperatures between 115° C. and 138° C. for a blocked acid catalyzed system. For an unblocked acid catalyzed system, the cure temperature is preferably between 82° C. and 99° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

The invention is further described in the following examples.

EXAMPLE 1

Preparation of polyol having at least one pendant carbamate group

A three neck round bottom flask was fitted with a condenser dewar, stirrer, ammonia inlet tube fitted with porous fritted glass tip and thermocouple. This apparatus was then placed in a metal container which was filled with dry ice, water, acetone and sodium chloride as a cold bath in order to control the temperature of the reaction. This reactor was loaded with hydroxyalkyl cyclic carbonate (Glycar®) with an equal molar amount of methanol. The temperature of the reaction components was dropped to 15° C. at which time ammonia gas was bubbled through the reaction until the temperature of the reaction increased to 32° C. At this time the reaction was continued to be stirred and cooled back down to 15° C. This procedure was continued until a carbonate peek was no longer seen in the infrared spectrum. This should take approximately 12 hours depending on the batch size and ammonia concentrations.

After all the Glycar® was converted to the glycol carbamate the reactor apparatus was converted so that a heated vacuum strip can be performed. The vacuum strip was started at room temperature to prevent bumping or over expansion of the system. The temperature was slowly increased (system permitting) to 80° C. under full vacuum 28 in Hg. The vacuum strip was complete when the gas chromatograph was clean of ammonia and methanol.

EXAMPLE 2

Preparation of diacid aliphatic intermediate with pendant carbamate functionality A three neck round bottom flask was fitted with a perforated 5 plate distilling column, stirrer, adapter claisen with solvent trap 50 milliliters, condenser, nitrogen inlet tube and thermocouple. This reactor was loaded with the following:

| Ingredients | Weight |
| --- | --- |
| Carbamate glycol | 600.00 |
| Hexahydro methyl phthalic anhydride | 1493.33 |
| Methyl amyl ketone (MIAK) | 600.00 |
| | 2693.33 |

The agitator was started and the vessel charged with 10 grams of toluene to the collection trap and slowly heated to 110° C. Once the reaction reached 110°C., the reaction was held at this temperature for two hours (some distillation of water was noticed). After the two hour hold the acid number and milliequivalents of the reaction was checked. The milliequivalents was in the range between (211–220)

EXAMPLE 3

Preparation of linear polyester polyol with pendant functional groups

A three neck round bottom flask was fitted with a perforated 3 plate distilling column, stirrer, adapter claisen with solvent trap 50 milliliters, condenser, nitrogen inlet tube and thermocouple. This reactor was loaded with the following:

| Ingredients | Weight |
| --- | --- |
| Example 2 intermediate precursor | 980.00 |
| 1,6 Hexane diol | 190.74 |
| Xylene | 50.00 |
| Dibutyl tin dilaurate | 0.15 |
| | 1220.89 |

The agitator and nitrogen inlet sparge were started. 30 grams of toluene was charged to the collection trap and slowly heated to 137.7° C. Once the reaction reached 137.7° C., the reaction was held at this temperature for four hours (azeotrope of toluene and water was observed). After the four hour hold, the temperature was slowly increased (10every half hour) to 170° C. where a very strong azeotrope of toluene and water was observed. The reaction temperature was held at 170° C. for 8 hours, at which time the first acid number was taken. The acid number was then taken every hour until the reaction reached a value between (5–10)AN or (0.089–0.178) milliequivalents per gram. After the reaction had extended to the predetermined acid number, the toluene was allowed to come over with the water until all the toluene was collected. The reaction was cooled to 100° C. and 700 grams of Exxate® 800 was added to the reaction, and the batch was allowed to continue to cool to room temperature.

The invention has been described in detail with reference to preferred embodiments thereof. It should be understood, however, that variations and modifications can be made within the spirit and scope of the invention.

What is claimed is:

1. A curable coating composition comprising:
    (1) a polyester that is the reaction product of a mixture comprising:
        (a) a dihydric alcohol having a carbamate group appended thereto, and
        (b) a polyacid, and
    (2) a curing agent having a plurality of groups that are reactive with carbamate.

2. A curable coating composition according to claim 1 wherein the curing agent is an aminoplast.

3. A curable coating composition according to claim 1 wherein the aminoplast is a melamine resin.

* * * * *